INVENTOR
WALTER KULISCHENKO
BY Edward A. Sage
ATTORNEY

PATENTED JUN29 1971 3,589,082

INVENTOR
PAUL F. SODAYKO
BY
Prangley, Clayton, Mullin,
Dithmar & Vogel
ATTYS.

LAPS

This invention relates to laps for lapping or abrading the walls of cylindrical holes, bores, or the like.

Laps which have been available heretofore such as that shown in the Anderson U.S. Pat. No. 2,401,215, granted May 28, 1946 are useful in lapping holes having diameters only up to about 1 inch. The adjustment mechanism in the Anderson patent is not satisfactory when the lap is designed to lap holes having diameters of at least about 1 inch, the adjusting structure not freely expanding laps of larger size.

Accordingly, it is the principal object of the present invention to provide laps which can be readily adjusted as to size when the diameter of the hole to be lapped is as great as 1 inch or greater.

Another object of the invention is to provide a lap for use in lapping the surfaces of holes of at least about 1 inch, wherein the lap comprises a lap cylinder having a plurality of longitudinally extending segments thereon, each of the segments having a lapping surface on the outer surface thereof and having a bearing structure of limited longitudinal extent on the inner surface thereof, a shank having one end thereof secured to one end of the cylinder with the longitudinal axes thereof substantially in alignment and having a longitudinally extending opening in the one end, and an adjusting screw having thread at one end threadedly engaging in the threaded opening of the shank and having a wrenching facility at the other end thereof, and an adjusting collar rotatably supported upon the adjusting screw and having a conical surface thereon engaging the bearing structures on the segments for adjusting the positions of the segments laterally with respect to the longitudinal axis of the cylinder.

Another object of the invention is to provide a lap of the type set forth wherein the bearing structures provide essentially line contact between the segments and the adjusting collar, the bearing structures each being the intersection of a part-cylindrical surface on the segment with a part-conical surface on the segment, the angle between the conical surface on the segment and the longitudinal axis of the cylinder being greater than the angle between the conical surface on the collar and the longitudinal axis of the cylinder.

Yet another object of the invention is to provide a barrel lap for use in lapping the surface of a hole having a diameter of at least about 1 inch, the lap having the desirable characteristics set forth hereinabove.

A further object of the invention is to provide a blind-hole lap for use in lapping the surface of a blind hole having a diameter of at least about 1 inch, the lap having the various desirable characteristics set forth hereinabove.

Further features of the invention pertain to the particular arrangement of the various parts of the laps, whereby the above outlined and additional operating features thereof are attained.

The invention, both as to its organization and method of operation, together with further objects and advantages thereof will best be understood by reference to the following specification taken in connection with the accompanying drawings, in which.

Figure 3:
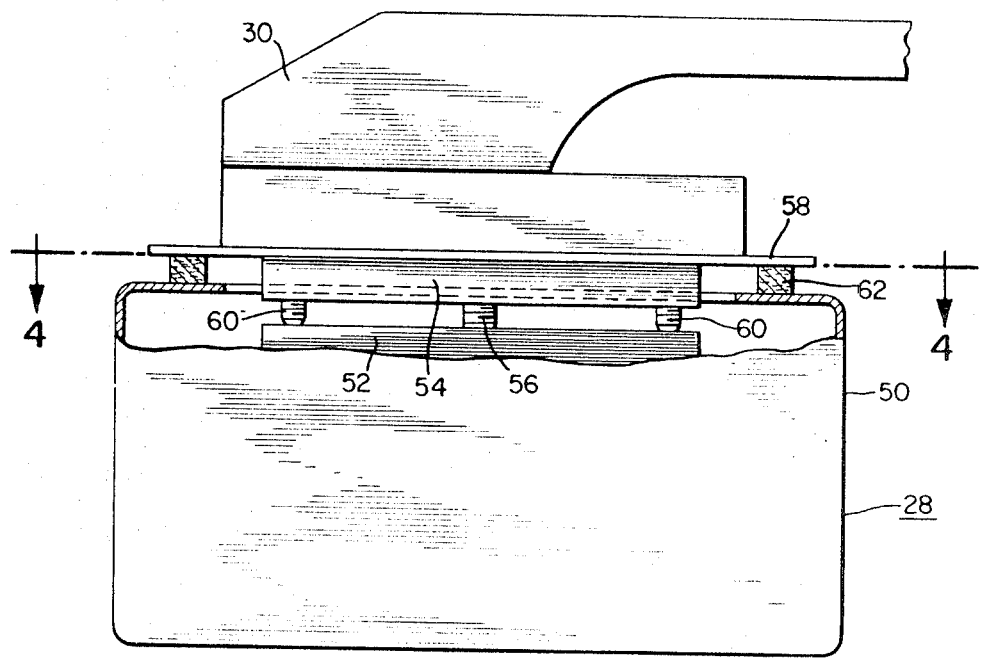
FIG. 3 is an end view of the right-hand end of the barrel lap illustrated in FIGS. 1 and 2.
Figure 1:
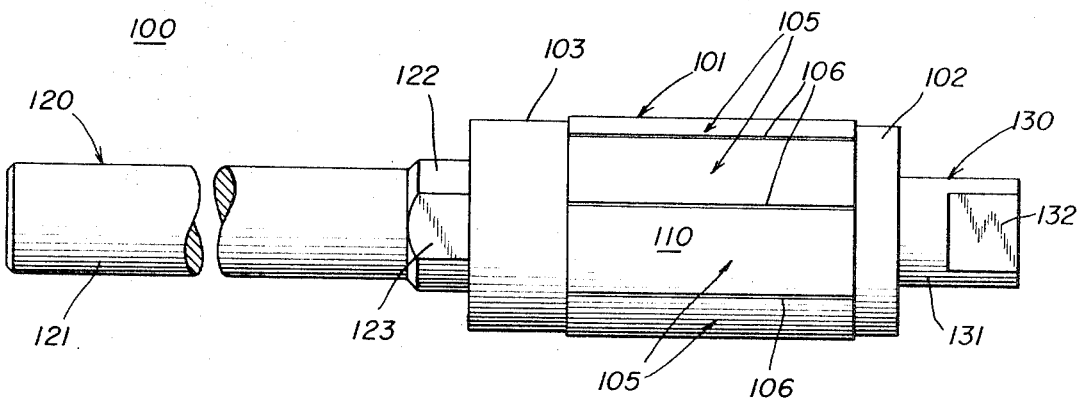
FIG. 1 is a side elevational view of a barrel lap made in accordance with and embodying the principles of the present invention, a portion of the shank thereof having been broken away.
Figure 2:
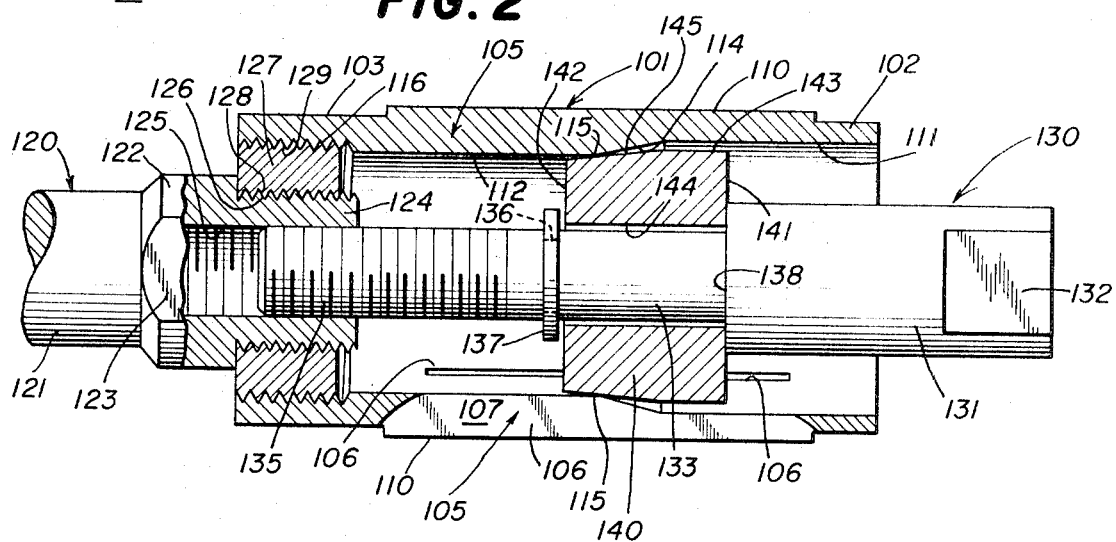
FIG. 2 is a partial view in vertical section through the barrel lap of FIG. 1 taken along the line 2–2 in FIG. 3.
Figure 3:
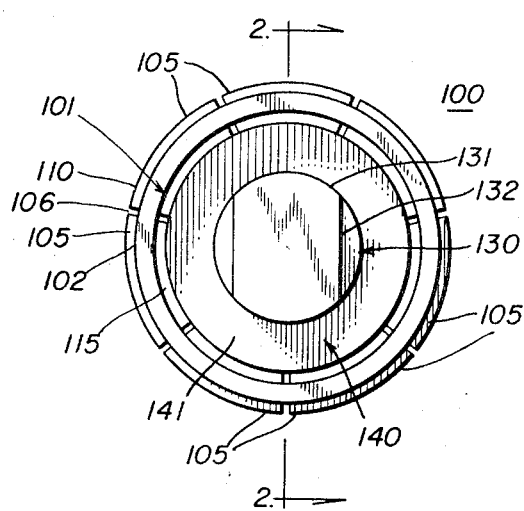
Figure 4:
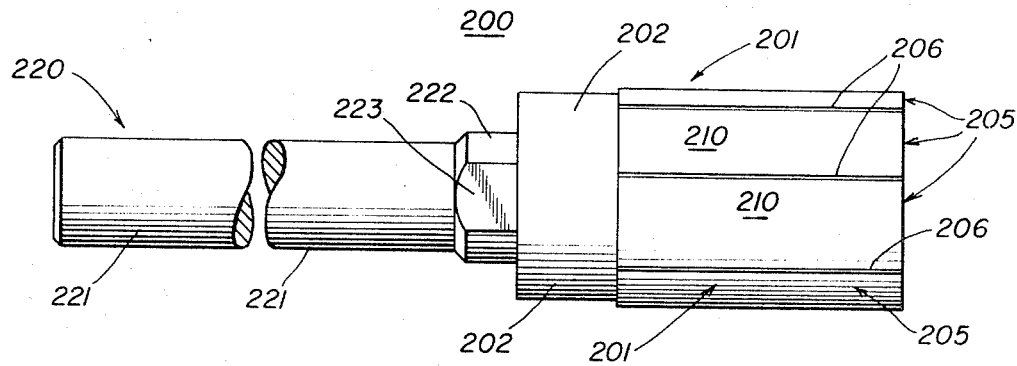

Referring to FIGS. 1 to 3 of the drawings, there is illustrated a barrel lap 100 made in accordance with and embodying the principles of the present invention, the barrel lap 100 being useful in abrading or polishing the walls of cylindrical holes that extend completely through the workpiece in which the hole is disposed. The barrel lap 100 includes generally a lapping cylinder 101, typically formed of brass, a shank 120 which is adapted to be held in a drill or other suitable machine tool for operating the barrel lap 100, and an adjusting screw 130 and an adjusting collar or mandrel 140, the screw 130 and the collar 140 cooperating with each other and with the cylinder 101 and the shank 120 to adjust the effective working diameter of the lapping cylinder 101 as will be described more fully hereinafter.

The lapping cylinder 101 is essentially cylindrical in shape and includes a shorter end portion 102 and a longer end portion 103, the end portions 102 and 103 being essentially the same external diameter. Disposed between the end portions 102 and 103 is a plurality of slots 106 which divide the lapping cylinder into a plurality of longitudinally extending segments 105, seven of the slots 106 being illustrated providing seven segments 105. The slots 106 may be milled, sawed, or cut in any desired manner. As illustrated, each segment 105 has a pair of side surfaces 107, the surfaces 107 being disposed parallel to a diameter of the lapping cylinder 101. It will be appreciated however that the surfaces 107 may be formed at an angle with respect to a diameter of the lapping cylinder 101, all as taught in the aforementioned Anderson U.S. Pat. No. 2,401,215.

Each of the segments 105 has a part-cylindrical outer surface 110 which serves as a lapping surface. The lapping cylinder 101 is further provided with an inner surface 111 of larger diameter at the end thereof adjacent to the end portion 102 and is provided with an inner surface 112 of smaller diameter at the end thereof adjacent to the end portion 103. Interconnecting the inner surfaces 111 and 112 is a cone-shaped or inclined surface 114 which is disposed at an angle of about 12° with respect to the longitudinal axis of the lap 100. The intersections of the surfaces 112 and 114 provide a plurality of bearing structures 115 in the form of part-circular lines extending about the axis of the lap 100, the bearing lines 115 being disposed essentially midway between the longitudinal ends of the associated segment 105. The bearing lines 115 more specifically are formed by the intersections of the part-cylindrical surfaces 112 and the part-conical surfaces 114. The outer end of the end portion 102 is internally threaded as at 116 to cooperate with the shank 120 as will be described more fully hereinafter. The outer end of the end portion 103 is internally threaded as at 116 to cooperate with the shank 120 as will be described more fully hereinafter.

As illustrated, the shank 120 is essentially cylindrical in shape and includes an elongated attachment portion 121 carrying on one end thereof an enlarged portion 122, the enlarged portion 122 having a pair of opposed wrenching surfaces or flats 123 thereon. The enlarged portion 122 further carries a reduced portion 124, the portions 122 and 124 having an opening 125 therein which is internally threaded. The reduced portion 124 is also externally threaded as at 126 and cooperates with a nut 127, which is internally threaded as at 128 to cooperate with the threads 126, and is externally threaded as at 129 to cooperate with the threads 116, thereby to mount the shank 120 upon the adjacent end of the lapping cylinder 101.

In order to adjust the effective working diameter of the lap 100, adjustment structure has been provided to move the surfaces 110 thereof inwardly and outwardly with respect to the longitudinal axis of the lap 100. More specifically, the adjusting screw 130 is providing carrying the adjusting collar or mandrel 140. The adjusting screw 130 includes an outer cylindrical portion 131 of a first diameter substantially less than the diameter of the inner surface 11, the outer cylindrical portion 131 carrying a pair of wrenching flats 132 at one end thereof. The other end of the cylindrical portion 131 carries a shank 133 extending therefrom and having the outer end thereof threaded as at 135, the threaded end 135 fitting within and threadedly engaging in the threaded opening 125 in the shank 120. By threading the shank 120 and the adjusting screw 130 with respect to one another, the adjusting screw 130 can be moved longitudinally with respect to the lapping cylinder 101. Intermediate at the ends of shank 133 is an annular groove 136 which receives a snapring 137 therein. Spaced from the snapring 137 and at the juncture of the cylindrical portion 131 and the shank 130 is a shoulder 138.

The adjusting collar 140 is carried by the adjusting screw 130, and more specifically has a longitudinally extending and centrally disposed opening 144 therethrough which received the shank 133, the adjusting collar 140 being trapped upon the adjusting screw 130 between the snapring 137 carried thereby and the shoulder 138 thereon. More specifically, the adjusting collar 140 has a pair of parallel surfaces 141 and 142, the surface 141 being disposed toward the shoulder 138 and the surface 142 being disposed toward the snapring 137. The adjusting collar 140 also has a cylindrical side surface 143 which merges with a conical side surface 145. The angle of inclination between the conical surface 145 and the longitudinal axis of the lap 100 is about 7°. The diameter of the smaller end of the conical surface 145 is just slightly less than the diameter of the circle on which lie the bearing lines 115 when the segments 105 are in the normal or nonstressed conditions thereof, whereby the conical surface 145 can readily be passed thereby.

In order to adjust the positions of the segments 105 toward and away from the longitudinal axis of the lap 100, it is necessary only to thread the adjusting screw 130 into and out of the shank 120. If it is desired to increase the effective working diameter of the lap 100, it is necessary to move the segments 105 laterally outwardly away from the longitudinal axis of the lap 100. This can be accomplished by threading the adjusting screw 130 into the shank 120 and to the left as viewed in FIG. 2, thereby to move the conical surface 145 to the left and thus to wedge the centers of the segments 105 outwardly due to the wedging contact between the bearing lines 115 and the conical surface 145.

On the other hand, if it is desired to decrease the effective working diameter of the lap 100, it is necessary to move the segments 105 laterally inwardly toward the longitudinal axis of the lap 100. This can be accomplished by threading the adjusting screw 130 on out the shank 120 and to the right as viewed in FIG. 2, thereby to move the conical surface 145 to the right and thus to remove the conical surface 145 to the right and thus to remove the pressure at the centers of the segments 105 to permit the same to move inwardly at the conical surface 145, the natural resilience in the segments 105 serving to urge the bearing lines 115 against the conical surface 145.

Adjustment of the effective working diameter of the lap 100 is achieved easily since the collar 140 is free to rotate with respect to the adjusting screw 130, whereby the only relative movement between the bearing lines 115 and the conical surface 145 is the sliding movement longitudinally therebetween, there being no component of rotational movement therebetween. As a result of the above-described structure, it has been found that the barrel lap 100 can be readily and easily adjusted as to size, even when the barrel lap 100 is constructed to lap holes having diameters as great as 1 inch or more, and even up to diameters as great as 3 inches.

In a constructional example of the barrel lap 100 for use in lapping holes having a diameter of about 1½ inches, the normal diameter of the lapping cylinder 201 prior to any adjustment thereof is 1½ inches; the overall length of the lapping cylinder 101 is 3 inches; the longitudinal extent of the segments 105 is 2 inches; the diameter of the inner surface 111 is 1¼ inches and the diameter of the inner surface 112 is 1⅛ inches.

Figure 4:
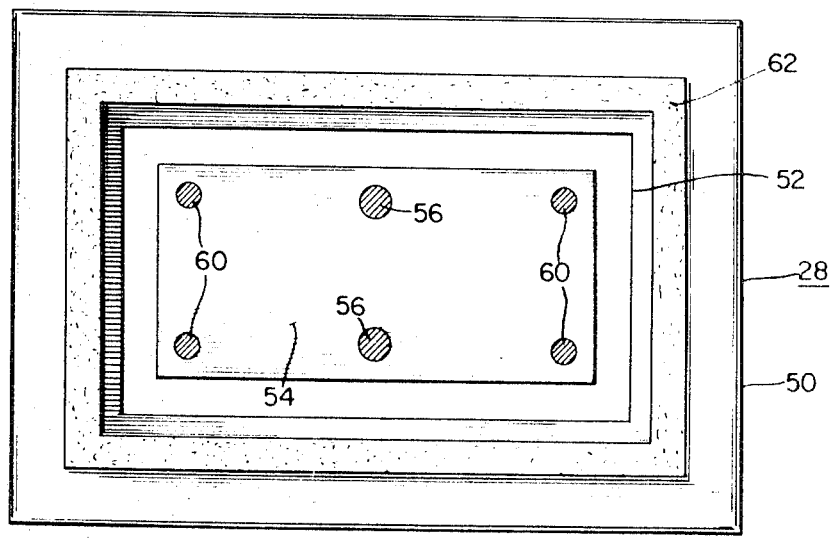
FIG. 4 is a side elevational view of a blind-hole lap made in accordance with and embodying the principles of the present invention, a portion of the shank thereof having been broken away.
Figure 5:
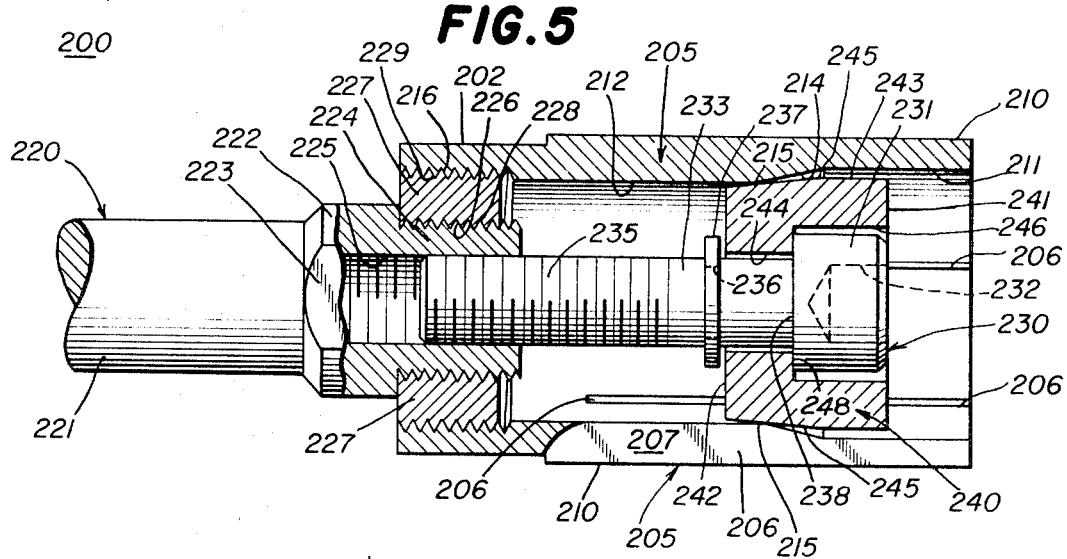
FIG. 5 is a partial view in vertical section throughout the blind-hole lap of FIG. 4 taken along the line 5–5 of FIG. 6.
Figure 6:
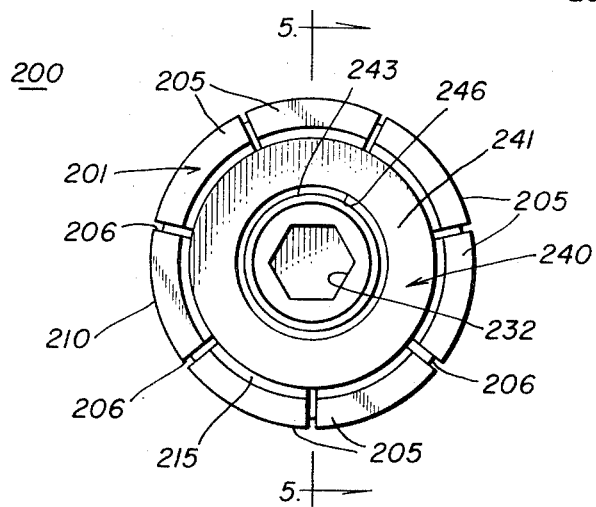
FIG. 6 is an end view of the right-hand end of the blind-hole lap illustrated in FIGS. 4 and 5.

Referring to FIGS. 4 to 6 of the drawings, there is illustrated a blind-hole lap 200 made in accordance with and embodying the principles of the present invention, the blind-hole lap 200 being useful in abrading or polishing the walls of cylindrical holes that do not extend completely through the workpiece, whereby the hole is referred to as being "blind." The blind-hole lap 200 includes generally a lapping cylinder 201, generally formed of brass, a shank 220 which is adapted to be held in a drill or other machine tool for operating the blind-hole lap 200, and an adjusting screw 230 and an adjusting collar or mandrel 240, the screw 230 and the collar 240 cooperating with each other and with the cylinder 201 and the shank 220 to adjust the effective working diameter of the lapping cylinder 201 as will be described more fully hereinafter.

The lapping cylinder 201 is essentially cylindrical in shape and includes an end portion 202 on which is disposed a plurality of longitudinally extending segments 205 formed by slots 206, seven of the slots 206 being illustrated providing seven segments 205. The slots 206 may be milled, sawed or cut in any desired manner, and as illustrated, there results on each segment 205 a pair of side surfaces 207, the surfaces 207 being disposed parallel to a diameter of the lapping cylinder 201. It will be appreciated however that the surfaces 207 may be formed at an angle with respect to a diameter of the lapping cylinder 101, all as taught in the aforementioned Anderson U.S. Pat. No. 2,401,215.

Each of the segments 205 has a part-cylindrical outer surface 210 which serves as a lapping surface. The lapping cylinder 201 is further provided with an inner surface 211 of larger diameter at the end thereof adjacent to the free ends of the segments 205 and is provided with an inner surface 212 of smaller diameter at the end thereof adjacent to the end portion 202. Interconnecting the inner surfaces 211 and 212 is a cone-shaped or inclined surface 214 which is disposed at an angle of about 12° with respect to the longitudinal axis of the lap 200. The intersections of the surfaces 212 and 214 provide a plurality of bearing structures 215 in the form of part-circular lines extending about the axis of the lap 200, the bearing lines 215 being disposed essentially midway between the longitudinal ends of the associated segments 205. The bearing lines 215 more specifically are formed by the intersections of the part-cylindrical surfaces 212 and the part-conical surfaces 214. The outer end of the end portion 202 is internally threaded as at 216 to cooperate with the shank 220 as will be described more fully hereinafter.

As illustrated, the shank 220 is essentially cylindrical in shape and includes an elongated attachment portion 221 carrying on one end thereof an enlarged portion 222, the enlarged portion 222 having a pair of opposed wrenching surfaces or flats 223 thereon. The enlarged portion 222 further carries a reduced portion 224, the portions 222 and 224 having an opening 225 therein which is internally threaded. The reduced portion 224 is also externally threaded as at 226 and cooperates with a nut 227, which is internally threaded as at 228 to cooperate with the threads 226 and is externally threaded as at 229 to cooperate with threads 216, thereby to mount the shank 220 upon the adjacent end of the lapping cylinder 201.

In order to adjust the effective working diameter of the lap 200, adjustment structure has been provided to move the surfaces 210 thereof inwardly and outwardly with respect to the longitudinal axis of the lap 200. More specifically, the adjusting screw 230 is provided carrying the adjusting collar or mandrel 240. The adjusting screw 230 includes an outer cylindrical portion 231 of a first diameter substantially less than the diameter of the inner surface 211, the outer cylindrical portion 231 carrying a wrenching socket 232 therein at one end thereof. The other end of the cylindrical portion 231 carries a shank 233 extending therefrom and having the outer end thereof threaded as at 235, the threaded end 235 fitting within and threadedly engaging in the threaded opening 225 in the shank 220. By threading the shank 220 and adjusting screw 230 with respect to one another, the adjusting screw 230 can be moved longitudinally with respect to the lapping cylinder 201. Intermediate the ends of the shank 233 is an annular groove 236 with receives a snapring 237 therein. Spaced from the snapring 237 and at the juncture of the cylindrical portion 231 and the shank 233 is a shoulder 238.

The adjusting collar 240 is carried by the adjusting screw 230, and more specifically has a longitudinally extending and centrally disposed opening 244 through which is received the shank 233. The adjusting collar 240 has a pair of parallel surfaces 241 and 242, the surface 241 being disposed toward the free ends of the segments 205 and the surface 242 being disposed toward the snapring 237. A cylindrical recess 246 is provided in the outer end of the collar 240 to receive the cylindrical portion 231, the recess 246 terminating in an abutment wall 248 against which bears the shoulder 238 on the adjusting screw 230. It will be seen therefore that the adjusting collar 240 is trapped open the adjusting screw 230 between the snapring 237 carried thereby and the shoulder 238 thereon. The adjusting collar 240 also has a cylindrical side surface 243 which merges with a conical side surface 245. The angle of inclination between the conical surface 245 and the longitudinal axis of the lap 200 is about 7°. The diameter of the smaller end of the conical surface 245 is just slightly less than the diameter of the circle on which lie the bearing lines 215 when the segments 205 are in the normal or nonstressed conditions thereof, whereby the conical surface 245 can readily be passed thereby.

In order to adjust the positions of the segments 205 toward and away from the longitudinal axis of the lap 200, it is necessary only to thread the adjusting screw 230 into and out of the shank 220. If is is desired to increase the effective working diameter of the lap 200, it is necessary to move the segments 205 laterally outwardly away from the longitudinal axis of the lap 200. This can be accomplished by threading the adjusting screw 230 into the shank 220 and to the left as viewed in FIG. 5, thereby to move the conical surface 245 to the left and thus to wedge the centers of the segments 205 outwardly due to the wedging contact between the bearing lines 215 and the conical surface 245. On the other hand, if it is desired to decrease the effective working diameter of the lap 200, it is necessary to move the segments 205 laterally inwardly toward the longitudinal axis of the lap 200. This can be accomplished by threading the adjusting screw 230 out of the shank 220 and to the right as viewed in FIG. 5, thereby to move the conical surface 245 to the right and thus to relieve the pressure at the centers of the segments 205 to permit the same to move inwardly as the conical surface 245 is withdrawn, the natural resilience in the segments 205 serving to urge the bearing lines 215 against the conical surface 245.

Adjustment of the effective working diameter of the lap 200 is achieved easily since the collar 240 is free to rotate with respect to the adjusting screw 230, whereby the only relative movement between the bearing lines 215 and the conical surface 245 is the sliding movement longitudinally therebetween, there being no component of rotational movement therebetween. As a result of the above described structure, it has been found that the blind-hole lap 200 can be readily and easily adjusted as to size, even when the blind-hole lap 200 is constructed to lap holes having diameters as great as 1 inch or more, and even up to diameters as great as 3 inches.

In a constructional example of the blind-hole lap 200 for use in lapping holes having diameters of about 1½ inches, the normal diameter of the lapping cylinder 201 prior to any adjustment thereof if 1½ inches; the overall length of the lapping cylinder 201 is 3 inches; the longitudinal extent of the segments 205 is 2 inches; the diameter of the inner surface 211 is 1¼ inches and the diameter of the inner surface 212 is 1⅛ inches.

While there have been described what are at present considered to be certain preferred embodiments of the invention, it will be understood that various modifications may be made therein, and it is intended to cover in the appended claims all such modifications as fall within the true spirit and scope of the invention.

What I claim is:

1. A lap for use in lapping the surfaces of holes having a diameter of at least about 1 inch, said lap comprising a lapping cylinder having a plurality of longitudinally extending segments thereon, each of said segments having a lapping surface on the outer surface thereof and having a bearing structure of limited longitudinal extent on the inner surface thereof, a shank having one end thereof secured to one end of said cylinder with the longitudinal axes thereof substantially in alignment and having a longitudinally extending opening in said one end, an adjusting screw having thread at one end thereof threadedly engaging in the threaded opening in said shank and having a wrenching facility at the and an adjusting collar rotatably supported upon said adjusting screw and having a conical surface thereon engaging said bearing structures on said segments for adjusting the positions of said segments laterally with respect to the longitudinal axis of said cylinder.

2. The lap set forth in claim 1, wherein said bearing structures are respectively disposed at the longitudinal midpoint of the associated segment.

3. The lap set forth in claim 1, wherein said bearing structures provide essentially line contact between said segments and said adjusting collar.

4. The lap set forth in claim 1, wherein said bearing structure is the intersection of a part-cylindrical surface on said segment with a part-conical surface on said segment, the angle between said conical surface on said segment and the longitudinal axis of said cylinder being greater than the angle between said conical surface on said collar and the longitudinal axis of said cylinder.

5. The lap set forth in claim 4, wherein the angle between said conical surface on said segment and the longitudinal axis of said cylinder is about 12°, and the angle between said conical surface on said collar and the longitudinal axis of said cylinder is about 7°.

6. A barrel lap for use in lapping the surfaces of holes having a diameter of at least about 1 inch, said lap comprising a lapping cylinder including a pair of cylindrical ends having interconnected therewith and disposed therebetween a plurality of longitudinally extending segments, each of said segments having a lapping surface on the outer surface thereof and having a bearing structure of limited longitudinal extent on the inner surface thereof, a shank having one end thereof secured to one end of said cylinder with the longitudinal axes thereof substantially in alignment and having a longitudinally extending opening in said one end, an adjusting screw having thread at one end thereof threadedly engaging in the threaded opening in said shank and having a wrenching facility at the other end thereof, and an adjusting collar rotatably supported upon said adjusting screw and having a conical surface thereon engaging said bearing structures on said segments for adjusting the positions of said segments laterally with respect to the longitudinal axis of said cylinder.

7. The barrel lap set forth in claim 6, wherein said wrenching facility is a plurality of wrenching flats on the exterior of said adjusting screw.

8. A blind-hole lap for use in lapping the surfaces of blind holes having a diameter of at least about 1 inch, said lap comprising a lapping cylinder including a cylindrical end having a plurality of longitudinally extending segments thereon with the outer ends of said segments being free and unsupported, each of said segments having a lapping surface on the outer surface thereof and having a bearing structure of limited longitudinal extent on the inner surface thereof, a shank having one end thereof secured to one end of said cylinder with the longitudinal axes thereof substantially in alignment and having a longitudinally extending opening in said one end, an adjusting screw having thread at one end thereof threadedly engaging in the threaded opening in said shank and having a wrenching facility at the other end thereof, no part of said adjusting screw extending beyond the free ends of said segments whereby the free ends of said segments can seat in a blind hole, and an adjusting collar rotatably supported upon said adjusting screw and having a conical surface thereon engaging said bearing structures on said segments for adjusting the positions of said segments laterally with respect to the longitudinal axis of said cylinder.

9. The blind-hole lap set forth in claim 8, wherein said wrenching facility is a wrenching socket disposed in the other end of said adjusting screw.

UNITED STATES PATENT OFFICE
CERTIFICATE OF CORRECTION

Patent No. 3,589,082            Dated  June 29, 1971

Inventor(s)  Paul F. Sodayko

It is certified that error appears in the above-identified patent and that said Letters Patent are hereby corrected as shown below:

Column 6, Claim 1, Line 12, after "the" insert

-- other end thereof, --.

Signed and sealed this 14th day of December 1971.

(SEAL)
Attest:

EDWARD M. FLETCHER, JR.          ROBERT GOTTSCHALK
Attesting Officer                Acting Commissioner of Patents